(12) United States Patent
Braun (10) Patent No.: US 8,899,963 B2
(45) Date of Patent: Dec. 2, 2014

(54) HOT NOZZLE FOR LATERAL SPRAYING

(75) Inventor: Peter Braun, Hungen (DE)

(73) Assignee: Ewikon Heisskanalsysteme GmbH, Frankenberg (DE)

( * ) Notice: Subject to any disclaimer, the term of this patent is extended or adjusted under 35 U.S.C. 154(b) by 355 days.

(21) Appl. No.: 13/318,645

(22) PCT Filed: Apr. 27, 2010

(86) PCT No.: PCT/EP2010/055651
§ 371 (c)(1),
(2), (4) Date: Feb. 6, 2012

(87) PCT Pub. No.: WO2010/127965
PCT Pub. Date: Nov. 11, 2010

(65) Prior Publication Data
US 2012/0118999 A1     May 17, 2012

(30) Foreign Application Priority Data

May 6, 2009   (DE) .................... 20 2009 004 786 U (51) Int. Cl.
*B29C 35/00*   (2006.01)
*B29C 45/28*   (2006.01)
*B29C 45/27*   (2006.01)

(52) U.S. Cl.
CPC ......... *B29C 45/2735* (2013.01); *B29C 45/2806* (2013.01); *B29C 45/281* (2013.01)
USPC .............................. 425/566; 425/562; 425/564

(58) Field of Classification Search
CPC ............ B29C 33/0038; B29C 33/0061; B29C 33/0077
USPC .......................................... 425/562, 564, 566
See application file for complete search history.

(56) References Cited

U.S. PATENT DOCUMENTS

| 4,154,288 A | * | 5/1979 | Borgen ......................... 164/314 |
| 5,670,190 A | | 9/1997 | Osuna-Diaz |
| 5,948,450 A | | 9/1999 | Swenson et al. |

(Continued)

FOREIGN PATENT DOCUMENTS

| DE | 90 03 574 | 7/1990 |
| DE | 197 42 099 | 4/1998 |

(Continued)

OTHER PUBLICATIONS

"Ewikon—Heisskanalforum mit Produktpremiere",Huethig GMBH Heidelberg, May 22, 2006, Seite 1, XP002438954 ISSN: 0032-1338.

(Continued)

*Primary Examiner* — Timothy Kennedy
*Assistant Examiner* — David N Brown, II
(74) *Attorney, Agent, or Firm* — Barnes & Thornburg, LLP (57) ABSTRACT

A hot nozzle for spraying of plastic components. The hot nozzle includes a multipart nozzle body including a tip inset including a tip element having a tip section protruding outwardly beyond a circumferential surface of the multipart nozzle body into a molding plate. The tip section of the tip element is penetrated by a shut-off needle which is movable in a reciprocating manner by a drive. The shut-off needle is movable between a position in which the shut-off needle closes off a feed borehole in the molding plate and a position in which the shut-off needle opens the feed borehole.

16 Claims, 11 Drawing Sheets

(56) References Cited

U.S. PATENT DOCUMENTS

| | | | |
|---|---|---|---|
| 6,899,122 B1* | 5/2005 | Mele | 137/312 |
| 2002/0098262 A1 | 7/2002 | Babin | |
| 2003/0068404 A1* | 4/2003 | Murayama et al. | 425/566 |
| 2005/0067510 A1* | 3/2005 | Schreck | 239/548 |
| 2006/0082031 A1 | 4/2006 | Dewar | |
| 2009/0074906 A1* | 3/2009 | Braun | 425/548 |

FOREIGN PATENT DOCUMENTS

| | | |
|---|---|---|
| DE | 100 08 471 | 8/2001 |
| DE | 102 31 093 | 10/2003 |
| DE | 103 21 355 | 5/2004 |
| DE | 103 45 578 | 5/2005 |
| DE | 10 2005 050 360 | 7/2006 |
| DE | 20 2006 012 676 | 9/2007 |
| DE | 20 2006 008 988 | 11/2007 |
| DE | 20 2008 005 073 | 8/2008 |
| DE | 10 2008 028 577 | 12/2008 |
| EP | 0 186 413 | 7/1986 |
| EP | 0 447 573 | 9/1991 |
| EP | 0 832 729 | 4/1998 |
| EP | 0 924 045 | 6/1999 |
| EP | 1 380 400 | 1/2004 |
| EP | 1 524 091 | 4/2005 |
| EP | 1 938 945 | 7/2008 |
| GB | 2 158 766 | 11/1985 |
| JP | 7-144347 | 6/1995 |
| JP | 7-251428 | 10/1995 |
| WO | 96/27489 | 9/1996 |
| WO | 99/37461 | 7/1999 |
| WO | 00/37231 | 6/2000 |
| WO | 00/43187 | 7/2000 |
| WO | 03/031146 | 4/2003 |
| WO | 2008/004968 | 1/2008 |

OTHER PUBLICATIONS

German Search Report corresponding to Application No. DE 20 2009 004 786.5 dated May 6, 2009.

Notification of Transmittal of the International Preliminary Report on Patentabilityt and the Written Opinion for PCT/EP2010/055651, filed Apr. 27, 2010.

Notification of Transmittal of Translation of the International Preliminary Report on Patentabilityt and the Written Opinion for PCT/EP2010/055651, filed Apr. 27, 2010.

* cited by examiner

HOT NOZZLE FOR LATERAL SPRAYING

CROSS-REFERENCE TO RELATED APPLICATION

This application is a national stage of International Application PCT/EP2010/055651, filed Apr. 27, 2010, and claims benefit of and priority to German Patent Application No. 20 2009 004 786.5, filed May 6, 2009, the content of which Applications are incorporated by reference herein.

BACKGROUND AND SUMMARY

The present disclosure relates to a hot nozzle for lateral spraying of plastic components. The hot nozzle includes a multipart nozzle body including a tip inset including a tip element having a tip section protruding outwardly beyond a circumferential surface of the multipart nozzle body into a molding plate.

Reference is made to WO 99/37 461 A1, US2002/0098262 A1 and EP 0186 413 A2 concerning the technological background.

It is often advantageous in plastic injection molding technology to spray plastic parts laterally, for example, perpendicularly or obliquely in relation to the demolding direction. For this purpose, so-called hot nozzles are used for lateral spraying. Those hot nozzles are also known as lateral spraying nozzles which comprise a nozzle body and tip elements. In order to achieve advantageous temperature control for the melt up to the surfaces of the article, the nozzle tips or tip elements need to be guided right up to the surface of the article.

It is further known to divide mold components, for example, die components, which enclose the nozzle body, so that the nozzle tips or the nozzle body can be mounted in the case of arrangements with multiple cavities. Such a state of the art is shown in DE 100 08 471 A1. This division is disadvantageous because a complex construction of the mold needs to ensure the necessary locking forces in order to prevent leakages.

That is why constructions of lateral spraying nozzles with tip elements appear to be advantageous which allow using undivided insets. This can occur, for example, with adjustable tip elements such as proposed in DE 197 42 099 A1, or with the help of a subsequent mounting of the tips in an integral nozzle body once the nozzle body has been mounted. See, for example, EP 1524091 A2 and DE 103 45 578 A1. In the case of the tip elements which are mounted in narrow fits, the fitting gaps will be tightly held after a period of use of incinerated plastic to such an extent that destruction-free dismounting is often not possible. The disadvantages of the adjusting mechanism are the filigree components which are partly wetted with the melt, and after prolonged use, do not allow any reliable adjustment or dismounting of the tips any more. The adjusting devices often do not permit any high force or pressure loads because they do not provide sufficient pressure area due to the limited overall space.

The tip elements mounted in the integral nozzle body usually need to be provided with a very small configuration in order to remain mountable. Moreover, mounting and/or dismounting is exceptionally difficult in the known systems and can often only be achieved after prolonged use by destroying the tips.

It is known from EP 0 447 573 A1 and DE 90 03 574 to arrange the nozzle body not in an integral manner but in a divided manner so that this difficulty is reduced. A holding ring is placed on a kind of base part, for example, see FIG. 1 of EP 0 447 573 A1, on the axial side of which guide tips are held with a clamping ring. Mounting and dismounting of the tip elements are still not simple enough. Moreover, the melt flow is also not guided in a leakage-free manner from the melt entrance into the nozzle body up to the gate on the article, since the melt can also axially escape from the base part and flow about the guide tips. Considerable difficulties can arise in dismounting the tip elements by the ambient solidified plastic compound. The solidified plastic compound needs to be removed laboriously at first. Alternatively, the hot nozzle can be dismounted with the still pasty plastic material.

One solution to the aforementioned problems is provided by DE 20 2008 005 073, which, on the basis of a concept of a divided nozzle body, further develops the state of the art as mentioned above in such a way that it is possible to house even relatively large tip elements in the nozzle body in a simple way and to simply mount and dismount them even after prolonged use. One relevant advantage of these nozzles is, therefore, that the tip inset can be installed by a pivoting movement from the separating plane of the mold. In this process, the at least one tip of the tip element easily reaches the surface of the article to be sprayed and, after complete mounting of all components, the melt flow is guided in a leakage-free manner from the melt entrance into the nozzle body up to the gate at the article. Relatively large locking forces can be realized by the chosen configuration of the nozzle body, so that a high level of leakproofness is achieved. After mounting the tip inserts, the sealing sleeves will rest on the wall of the mold inset according to a preferred variant, or are spaced to such an extent that, after reaching the operating temperature, a sufficient surface pressing can be achieved between the sealing sleeve and the wall of the mold inset as a result of the thermal expansion of the entire nozzle.

On the basis of such a solution, the embodiments of the present disclosure are based on further developing the constructions known from DE 20 2008 005 073, in a constructionally simple manner in such a way that its range of use is expanded.

Thus, the present disclosure relates to a hot nozzle for spraying of plastic components. The hot nozzle includes a multipart nozzle body including a tip inset including a tip element having a tip section protruding outwardly beyond a circumferential surface of the multipart nozzle body into a molding plate. The tip section of the tip element is penetrated by a shut-off needle which is movable in a reciprocating manner by a drive. The shut-off needle is movable between a position in which the shut-off needle closes off a feed borehole in the molding plate and a position in which the shut-off needle opens the feed borehole.

Additional disclosure is included in the descriptions below and in the accompanied drawings and claims.

Figure 4:
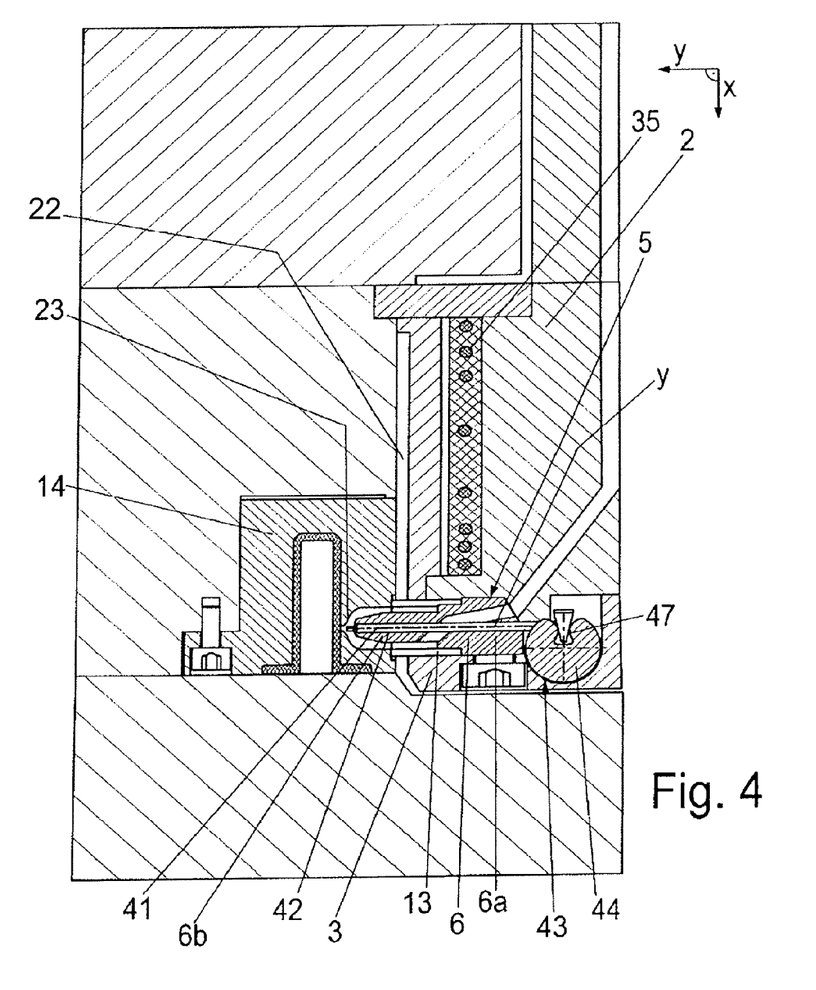
FIG. 4 shows a sectional view of a second hot nozzle apparatus comprising a hot nozzle which is inserted in a mold and comprises a multipart nozzle body with tip insets inserted therein and a shut-off needle in addition to a drive apparatus for the shut-off needle, in accordance with the present disclosure.

In accordance with the embodiments of the present disclosure, the concepts disclosed in DE 20 2008 005 073, concerning needle shut-off systems are further developed. These further developed needle shut-off systems allow spraying positions very close to rising contours in so-called 0°, tip versions, as shown, for example, in the accompanying FIG. 1, which spraying positions have not been achieved except up until now with the direct hot nozzle spraying in accordance with the present disclosure. On the other hand, the gate in a 90°, tip version, see, for example, the accompanying FIG. 4, is very good. This is as a result of the shearing process during demolding of the article and is further developed into an entirely particle-free gate.

Moreover, the present disclosure includes advantageous mounting of the nozzle.

Notice must be taken that it is known from the state of the art, from EP 1380 400 A1, for example, to penetrate tip elements with shut-off needles. The solution shown in the EP 1 380 400 A1 specification does not allow the production of objects in which the demolding direction corresponds to the injection direction. Moreover, the solution shown in EP 1 380 400 A1 also has a relatively complex drive which is merely suitable for cylindrical hot nozzles. These disadvantages are also remedied by the embodiments according to the present disclosure with simple constructions.

The solutions disclosed in the embodiments of the present disclosure are advantageously suitable for the nozzle bodies and tip insets shown in the accompanying drawings. That is because they can be dismounted in an advantageous manner. Their use is not limited to the kind of tip insets disclosed however. The shut-off needles shown, for example, in FIG. 1 are considered to be used in nozzle bodies with tip elements arranged differently as long as they are provided with a fork-like head which protrudes outwardly over the external jacket of the nozzle bodies.

Other aspects of the present disclosure will become apparent from the following descriptions when considered in conjunction with the accompanying drawings.

DETAILED DESCRIPTION

Figure 1:
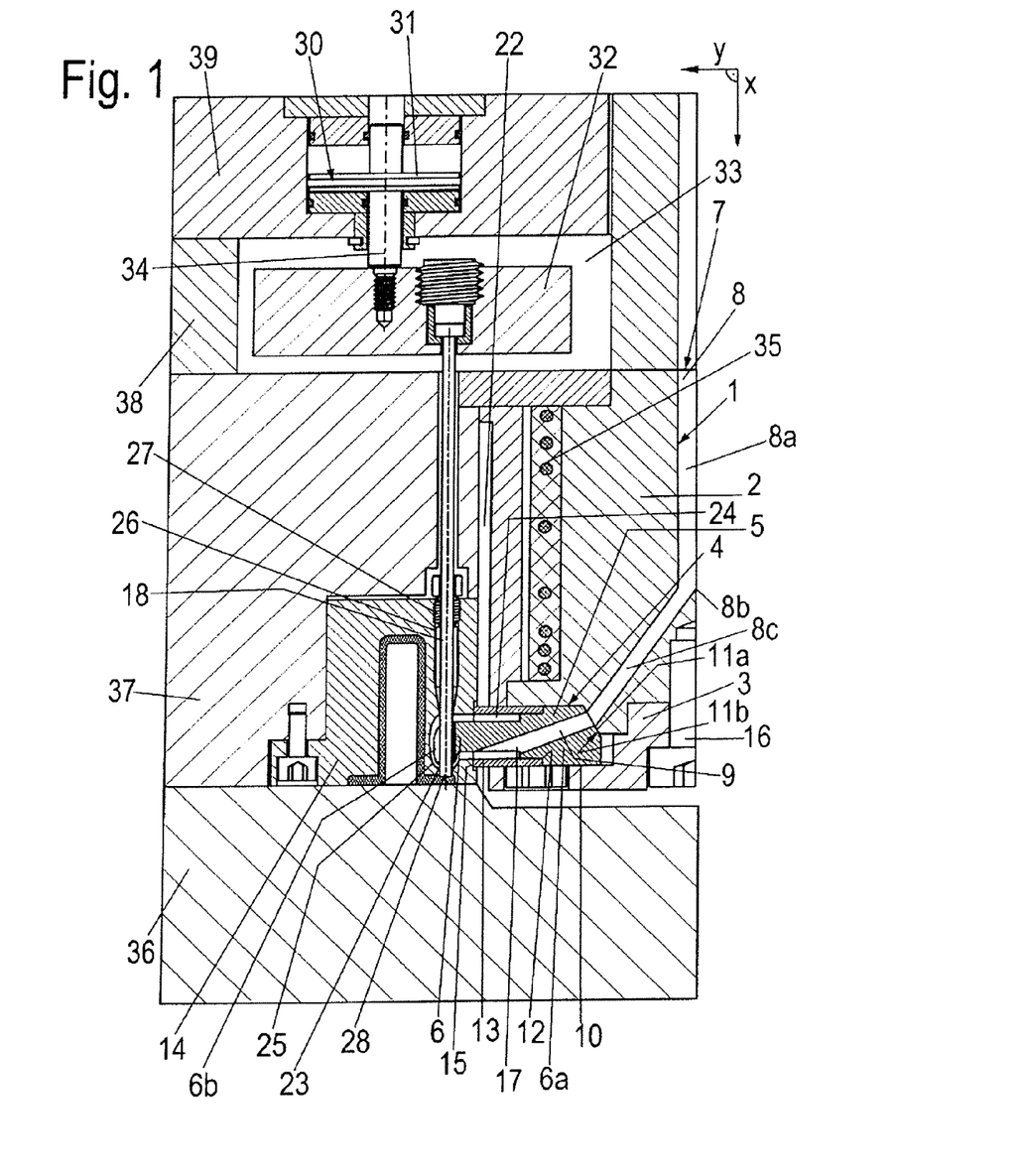
FIG. 1 shows a sectional view of a first hot nozzle apparatus comprising a hot nozzle which is inserted in a mold and comprises a multipart nozzle body with tip insets inserted therein and a shut-off needle in addition to a drive apparatus for the shut-off needle, in accordance with the present disclosure.

FIG. 1 shows a hot nozzle apparatus in sections, comprising a hot nozzle 1 which is arranged for lateral spraying of a plastic component and is arranged as a cylindrical sleeve with a flange.

The plastic component is injected into a casting mold including a molding plate 14 that includes a feed borehole 23. The feed borehole 23 is configured to be closed off by a shut-off needle 18 which, in the closed position of FIG. 1, tightly seals the feed borehole 23 of the molding plate 14, so that no plastic can enter the mold any more.

The heated hot nozzle 1 includes a multipart nozzle body with a nozzle body base section 2 enclosed by a heating element 35 and a nozzle body clamping disk section 3.

A combination of elements as just described may comprise a cylindrical outside jacket. See DE 20 2008 005 073, for example. The outside jacket could also have a non-circular cross-section, for example, an elliptical, oval or polygonal cross-section (see, for example, FIGS. 8 to 10).

The nozzle body base section 2 has an axial side which is provided with at least one or several recesses 4 which are arranged, for example, radially distributed over the circumference on the axial side for arranging and accommodating tip insets 5. These tip insets 5 comprise tip elements 6 and sealing sleeves 13. Corresponding recesses 10 are arranged in the nozzle body clamping disk section 3.

The following description is provided as an example and shall not be understood to be limiting. When the position of one or several of the tip insets 5 is described as being at other locations, it should be understood that the following features could also be provided in the case of several tip insets 5.

The terms such as "at the top" or "at the bottom" shall not be understood in a limiting manner and merely relate to the respective arrangement and alignment as shown in the drawings.

One of the tip insets 5 is arranged in the recesses 4, 10. The tip elements 6 (also see FIG. 2 and FIG. 3) each comprise a base body $6a_,$, which is followed by a respective tip section 6b, which, as shown in FIG. 1, is arranged in a cylindrical manner in a first region and is arranged in a fork-like manner at its outermost end.

The nozzle body base section 2 comprises a melt entrance opening 7 in a melt duct 8 (see FIG. 1) on its axial side facing away from the nozzle body clamping disk section 3, which is shown in FIG. 1.

As shown in FIG. 1, melt duct 8 extends first over a first section 8a, axially in the X direction through the nozzle body base section 2 up to a branch $8b,$, from which partial ducts 8c, branch off in the manner of rays and which each open into the recesses 4.

The partial ducts 8c, are in alignment with the melt ducts 9 in the tip elements 6 which are placed in the recesses 4, with the melt ducts 9 completely penetrating the tip elements 6 in the manner of boreholes. This occurs in an oblique manner relative to the direction X in which the melt ducts 8 extend into the section 8a.

The tip section 6b, of the tip element 6, which forms a fork at its outermost end faces outwardly in the mounted state on the nozzle body base section 2, for example, radially and protrudes outwardly beyond the circumferential edge of the nozzle body base section 2.

The tip insets 5 are arranged in such a way that, after insertion in the recesses 4, they are tightly held by corresponding recesses 10 of the subsequently mounted nozzle body clamping disk section 3.

In the region of the base body $6a,$, the tip insets 5 rest with an inclined surface 11a in a rearward direction on an inclined surface 11b, of the nozzle body base section 2 in their regions facing away from the tip section 6b. The melt ducts 8, 9, which are in alignment with each other, penetrate inclined surfaces $11a,$, 11b.

The base body 6a, of the tip insets 5 comprises sections with different diameters.

For example, a circumferential contact collar 12 is arranged in the axial direction.

A sealing sleeve 13 is slid onto each tip element 6, which sealing sleeve 13 rests on its one side axially on the contact collar 12 and on the contact surface 15 of a mold 14 on its other axial side in which the hot nozzle 1 is inserted.

The nozzle body clamping disk section 3 is configured to be fixed to the nozzle body base section 2 by one or several screws, for example, in the region of a stepped screw borehole 16 which penetrates the two elements in alignment.

The nozzle body clamping disk section 3, which is aligned axially in relation to the nozzle body base section 2, fixes the tip insets 5 in a non-positive and a positive manner to the nozzle body base section 2.

A stable leak-proof support occurs between the oblique surfaces 11a, 11b, and the supporting region of the sealing sleeves 13 on the mold 14.

The sealing sleeve 13 further delimits the region through which the melt flows when passing the multipart nozzle body up to the feed borehole 23.

The easy mountability and dismountability of the hot nozzle 1 arrangement is advantageous.

Figure 2A:
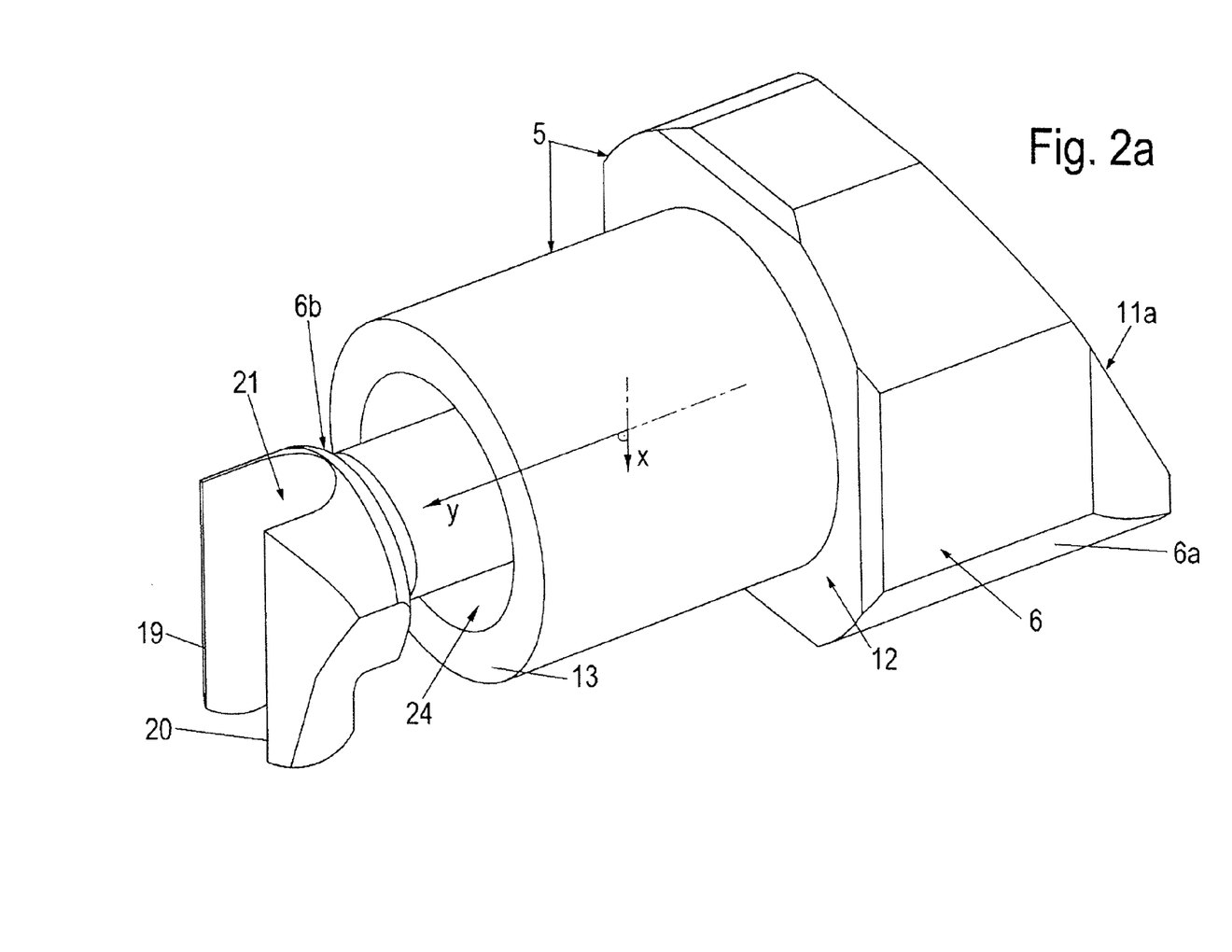
FIGS. 2a, 2b, show a perspective view of a tip inset and a sectional view through the tip inset, in accordance with the present disclosure.
Figure 2B:
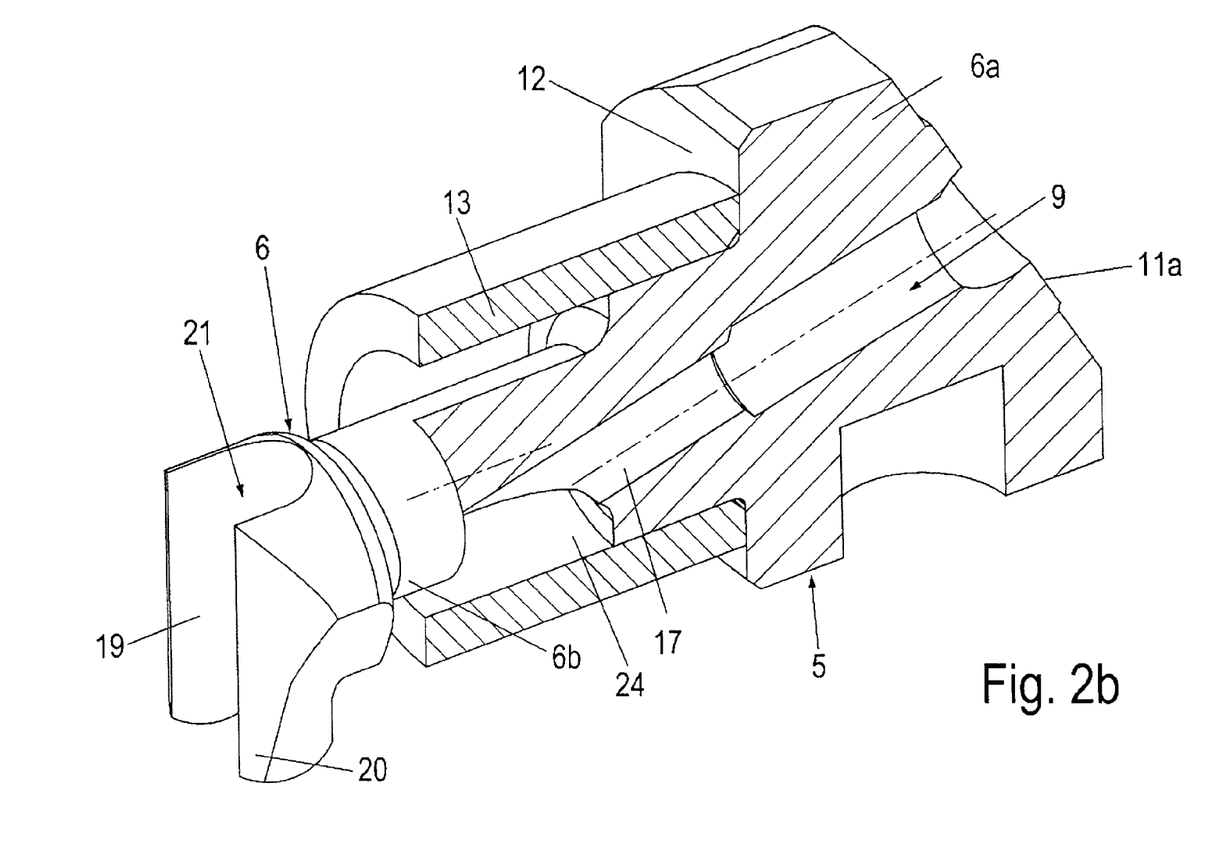
Figure 3:
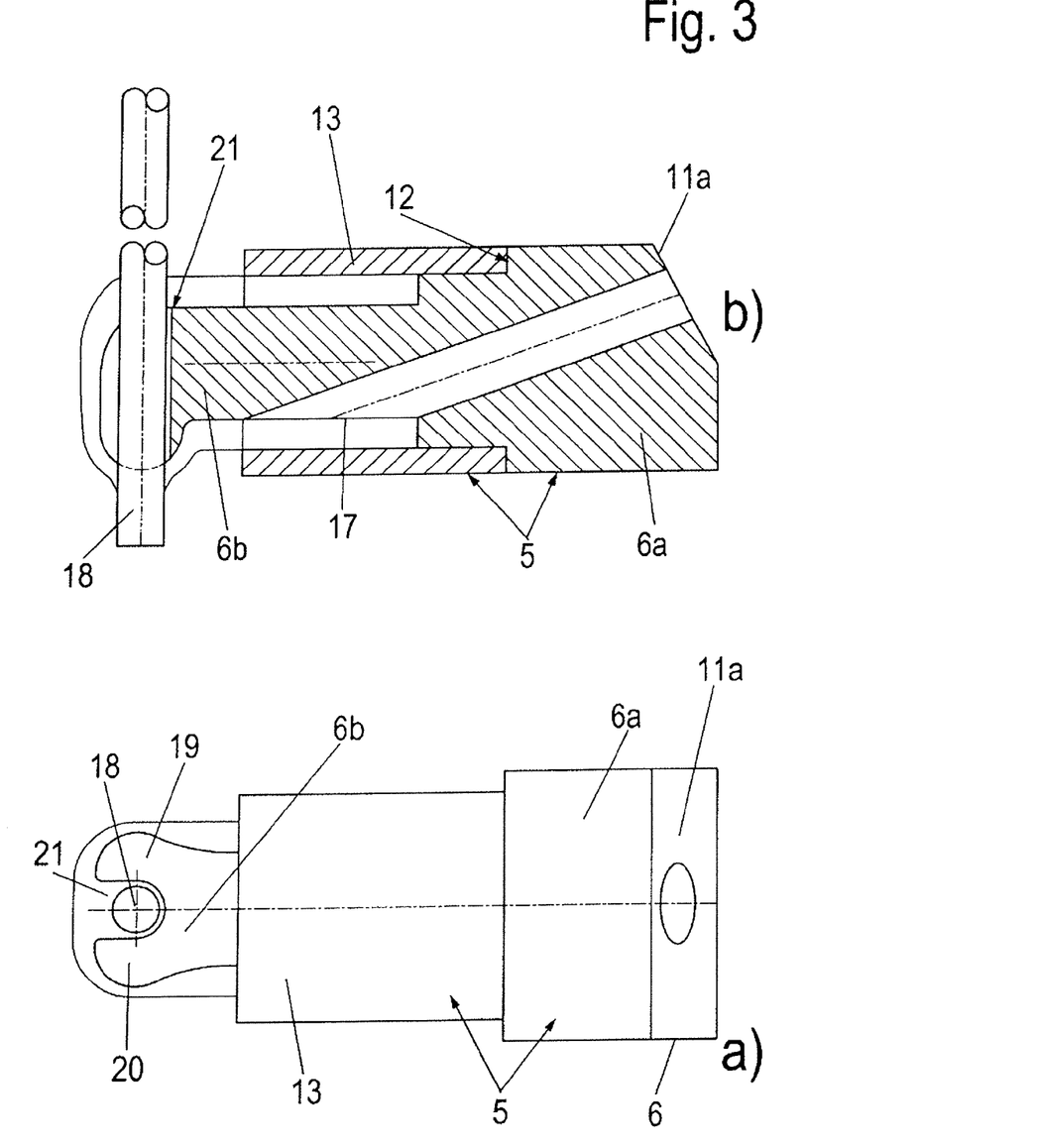
FIGS. 3a, 3b, show a top view of a tip inset with a shut-off needle and a sectional view through the tip inset and shut-off needle, in accordance with the present disclosure.

The at least one melt duct or melt guide duct 9 comprises an outlet opening 17 that opens into an annular feed space 24 which encloses the tip section 6b, which has a cylindrical shape of a portion of its length before it converges into the actual fork at its tip (see FIGS. 1, 2 and 3). The duct 9 is further delimited to the outside by the sealing sleeve 13 spaced from the tip section 6b, up to contact on the axial contact surface 15 and which extends into the mold 14 where it opens into the inlet opening/feed borehole 23 in the mold, which is in the molding plate 14.

In accordance with the present disclosure, each tip element 6 of each tip inset 5 may be configured to be penetrated by the movable shut-off needle 18. The shut-off needle 18 is associated with a drive 30 which is in operative connection with the shut-off needle 18 either directly or by way of one or several intermediate elements 32.

As shown in FIGS. 1, 2, and 3, the "penetration" of the tip inset 5 by the shut-off needle 18 occurs in such a way that the shut-off needle 18 penetrates the fork-like tip section 6b.

The fork-like tip section 6b, is delimited by two fork webs 19, 20, between which a gap 21 is provided which penetrates the tip section 6b, in the X direction (see FIGS. 1, 2, and 3).

The fork webs 19, 20 are arranged in the region in the tip insets 5 which protrudes upwardly beyond the circumferential edge of the nozzle body 2 and the sealing sleeve 13, that is, the fork webs 19, 20 are arranged in the feed space 24 in the molding plate 14. The fork webs 19, 20 face downwardly in the X direction, for example, see FIGS. 2 and 3, in order to guide the flowing plastic material into the entrance opening/feed borehole 23. The fork webs 19, 20 are arranged in such a way that they guide the heat flow from the nozzle body base section 2 via the tip element 6 in the X direction of the shut-off needle 18 and in the direction of the feed borehole, or gate, 23.

The shut-off needle 18 extending in the X direction penetrates the gap 21 without touching the tip section 6b, or the fork webs 19, 20.

As a result, the shut-off needle 18, advantageously, does not come into contact with the hot parts of the hot nozzle 1, for example, the nozzle body base section 2, the nozzle body clamping disk section 3, and the tip inset 5.

The feed space 24 continues in the molding plate 14 into a projection space 25 which extends downwardly in the X direction and on whose bottom end the entrance opening/feed borehole 23 is arranged which also extends in the X direction. The shut-off needle 18 is also aligned and movable in this direction. Its axis therefore lies perpendicularly to the main axis Y of the tip elements 6 with relation to the Y axis of the cylindrical area of the tip section 6b, (see FIG. 2).

The shutoff needle 18 is arranged in such a way that it seals the feed borehole 23 in a first position, as shown in FIG. 1, which feed borehole 23 is arranged in the molding plate 14.

The shut-off needle 18 can be moved from the position of FIG. 1 with the help of the drive 43 to a second position in which the shut-off needle 18 releases the feed borehole 23 in the molding plate 14 in such a way that molten plastic can flow through the melt ducts 8, 9 and the feed space 24 and the projection space 25 and the feed borehole 23 into the cavity to be filled in the molding plate 14 of the mold.

The shut-off needle 18 is only guided in the colder molding plate 14, for example, with a sleeve 27 which is inserted into a bore 26 in the molding plate 14 or into any other part of the cool mold.

A gap 22 is formed between the molding plate 14 and the heating element 35 or the actual hot nozzle 1 in order to separate the warmer or hotter region from the colder region of the surrounding molding plate 14. One or, for example, two nozzle body holders 51 are configured to be inserted in the gap 22 (see FIGS. 8 to 10), which holders 51 hold and fix the hot nozzle 1 in a cooler environment.

The shut-off needle 18 is fixed to a lifting plate 32 on its side facing away from the tip 28 which tightly seals the entrance opening 23 in the position shown in FIG. 1, which lifting plate 32 is movable in a reciprocating manner in a lifting space 33 of the mold in the X direction.

This movement occurs with the help of a fluid-actuated drive cylinder 30 which comprises a movable piston 31 with a piston rod 34 which is fixed to the lifting plate 32, for example, by being tightly screwed together, on its side facing away from the shut-off needle 18.

It is within the scope of the present disclosure to fix several of the shut-off needles 18 to the lifting plate 32 and to still move the lifting plate 32 with only one drive, for example, drive 30, or with only one single piston.

Figure 8:
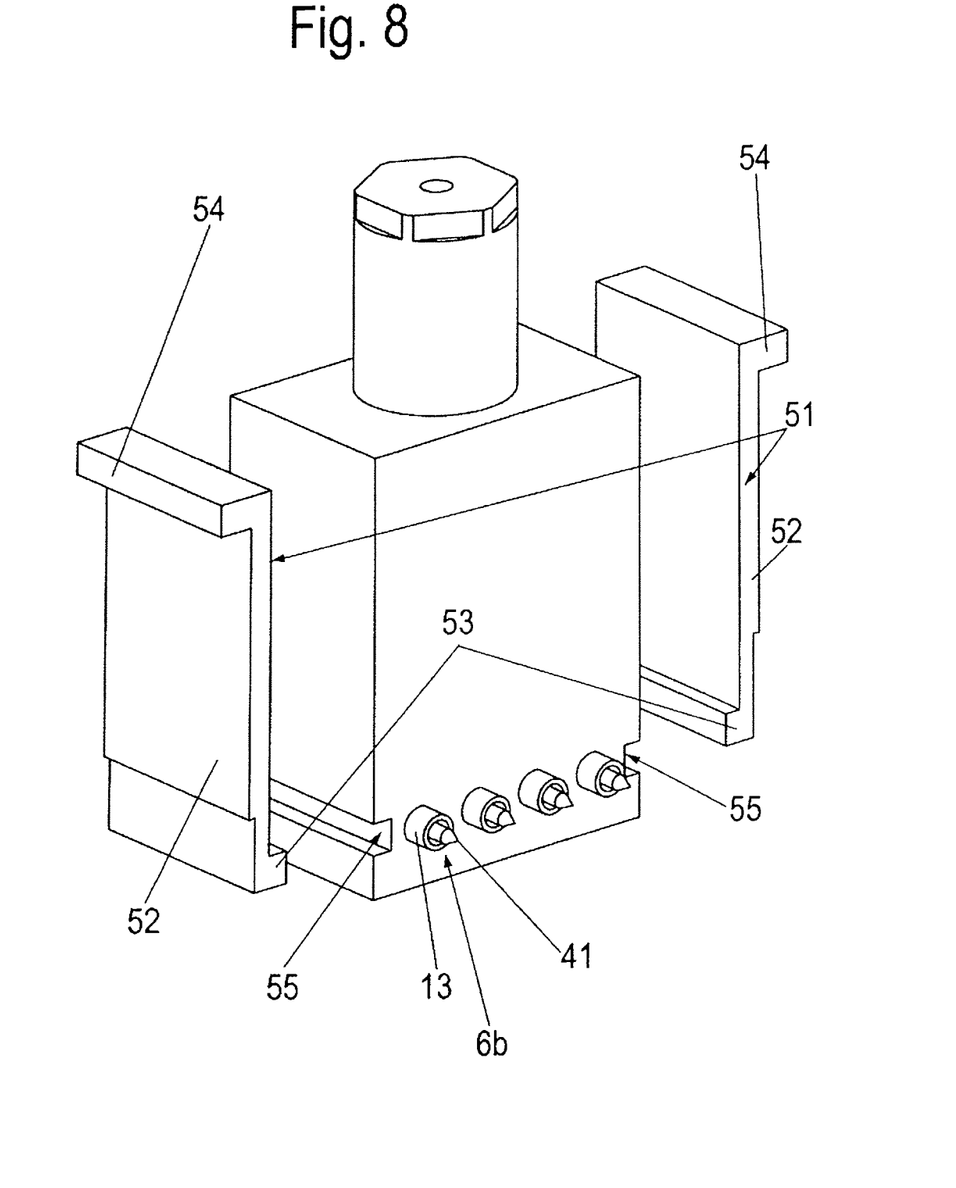
FIG. 8 shows a perspective view of a third hot nozzle apparatus having a holder in the position in which it is not yet mounted on the nozzle body, in accordance with the present disclosure.
Figure 9:
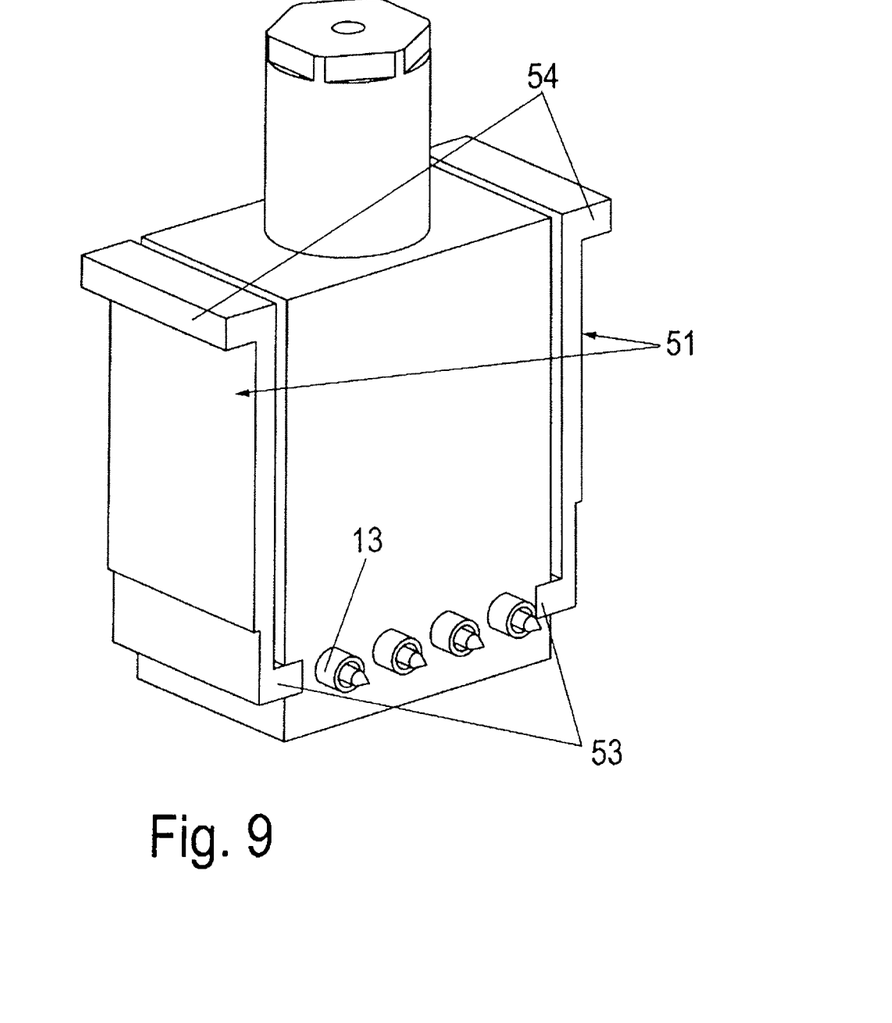
FIG. 9 shows the arrangement of FIG. 8 with the holder arranged on the nozzle body.
Figure 10:
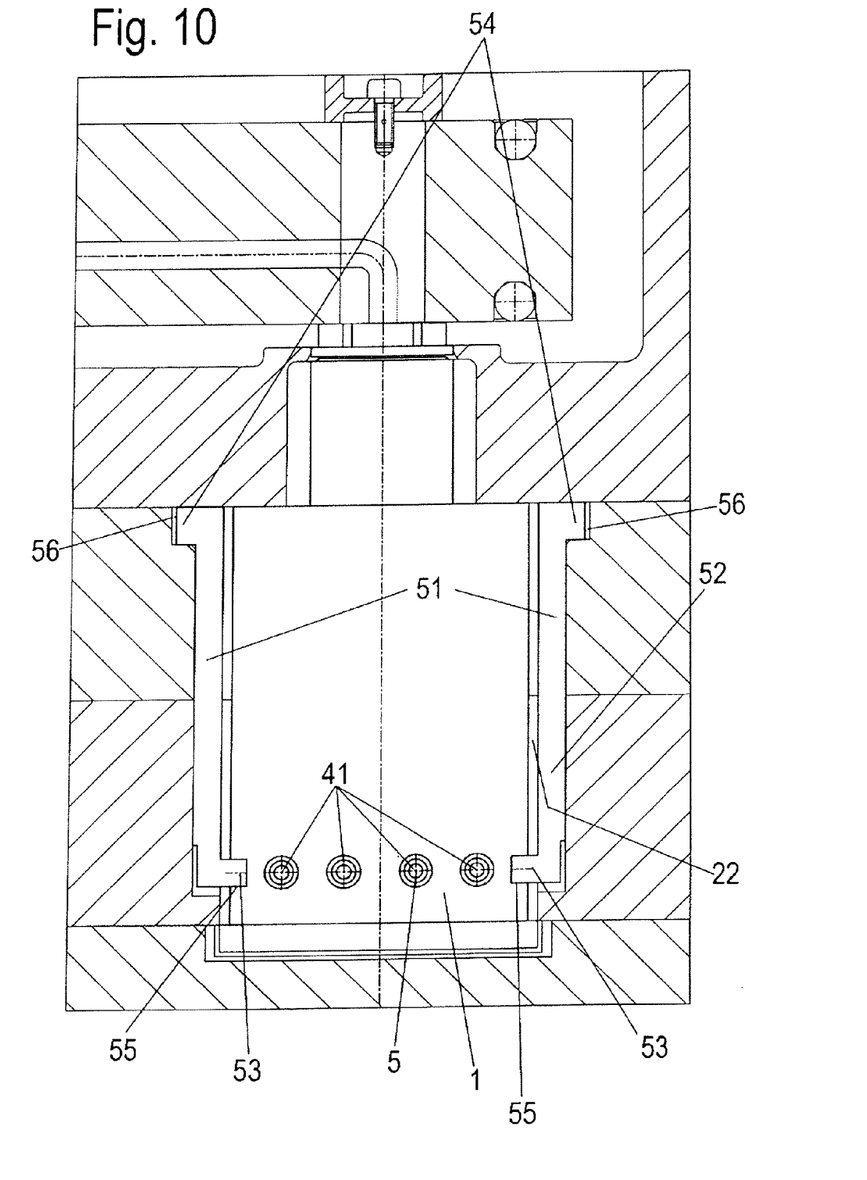
FIG. 10 shows the arrangement of FIG. 8 inserted in a mold.

The lifting plate 32 can, according to the present disclosure, be arranged as a ring disk which encloses a cylindrical nozzle body. It can also be arranged as a rectangular plate and extend on one side of a rectangular nozzle body, according to that is shown in FIGS. 8 to 10.

The hot nozzle system as described above offers remarkable advantages over the state of the art.

In accordance with FIG. 1, the spraying direction and the demolding direction are the same in plastic injection molding. For example, they both lie in the X direction because the molding component 36 is detached in the X direction in order to detach the finished sprayed plastic part from the mold.

If this is the case, there is a likelihood of high sprue puller gates or so-called stringing.

A high amount of sprue pull cannot be accepted for various reasons, such as the likelihood of injury. The detaching threads might further contaminate the sprayed plastic articles, which is entirely unsuitable or completely impermissible for articles in the field of medical technology, for example.

The arrangement of hot nozzle direct spraying with a needle shut-off system on the rear side of a flange, for example, on the rear side of the handle plate of a medical syringe body, represents something that remains unachieved until now, as revealed in the present disclosure.

Such a body can, surprisingly, be produced in accordance with the present disclosure and as shown in FIG. 1 without any likelihood of a sprue pull or stringing. This effect will be counteracted effectively with the needle shut-off system as disclosed by the present disclosure and shown herein.

The tip elements 6 are produced for this purpose with a fork-like tip or projection which, instead of a tapering and/or a bent, which tip projection comprises two projections having two fork webs 19, 20 which do not lead up to the article surface and enclose the penetrating shut-off needle 18 in a fork-like manner, for example, in a non-touching manner.

It is ensured, as a result of the fork shape as shown in FIGS. 1, 2a, and 2b, that the tip insets 5 can also be mounted and dismounted in the assembled state of the shut-off needles 18.

The drive 30 of the shut-off needles 18 may, for example, be realized, as described above, by a pneumatically or fluidically operated lifting plate 32. However, can also occur in any manner, according to the present disclosure.

The lifting plate 32 may, for example, be a preferred drive. However, because the tip insets 5 are usually very close to one another, individual drives may, for example, therefore be impossible.

A simultaneous opening of the feed boreholes or entrance openings 23 by lifting plate technology is, for example, advantageous because a high amount of process reliability is achieved thereby.

An actual shape may be a multipart one. That includes, for example, the aforementioned molding plate 14 and the corresponding mold core, which are arranged in such a way that a cylindrical body with a collar can be sprayed. In addition, further mold parts or components 36, 37, 38, 39 are provided in which parts of the mold are inserted and/or which hold the actual hot nozzle 1 by way of the holder 51.

It is understood that several such objects can be sprayed simultaneously in the molding plate 14 as long as they are arranged accordingly.

The sleeve 27 is installed as a needle seal in the cooled mold plate 14 and acts especially against the leakage of the highly pressurized melt during the injection process because the plastic melt is able to solidify in the gap between the needle 18 and the borehole 23 of the sleeve 27.

Another embodiment, according to the present disclosure, is described below.

The principal configuration of such an arrangement (see FIG. 4) corresponds to the embodiment of FIG. 1, particularly with respect to the configuration of the nozzle body 1 and the fixing and support of the tip insets 5 with the sealing sleeves 13 and the tip elements 6.

However, the tip elements 6, according to FIG. 4, respectively, do not comprise any tip sections 6b, on which fork webs 19, 20 are formed. The tip element 6 rather protrudes to the outside, perpendicularly to the X axis, beyond the edge of the nozzle body, which may, for example, be rectangular in its cross-section and opens into a needle-penetrated tip which tapers conically to the outside and which faces or is directed in the direction of an entrance opening/feed borehole 23 which is also directed perpendicularly to the outside in the Y direction. That is, in the direction of the main axis of the tip section 6b, and to the outside perpendicularly to the X direction.

The tip elements 6 are further penetrated in the Y direction by shut-off needles 41.

Tip elements 6 comprise an axial borehole 42 for this purpose which is penetrated completely by the tip insets 5 perpendicularly to the X direction.

The shut-off needles 41 are movable perpendicularly to the X direction. They are movable with the help of a drive 43 in order to enable them to move to a first position in which the needles 41 seal off the feed borehole/entrance opening 23 in the molding plate 14, which is nearly reached in FIG. 4, and to the second position of FIG. 5 in which the needles 41 release or open the boreholes 23, so that plastic material is able to flow into the cavity in the molding plate 14 in which the respective object to be sprayed is to be formed.

Figure 5:
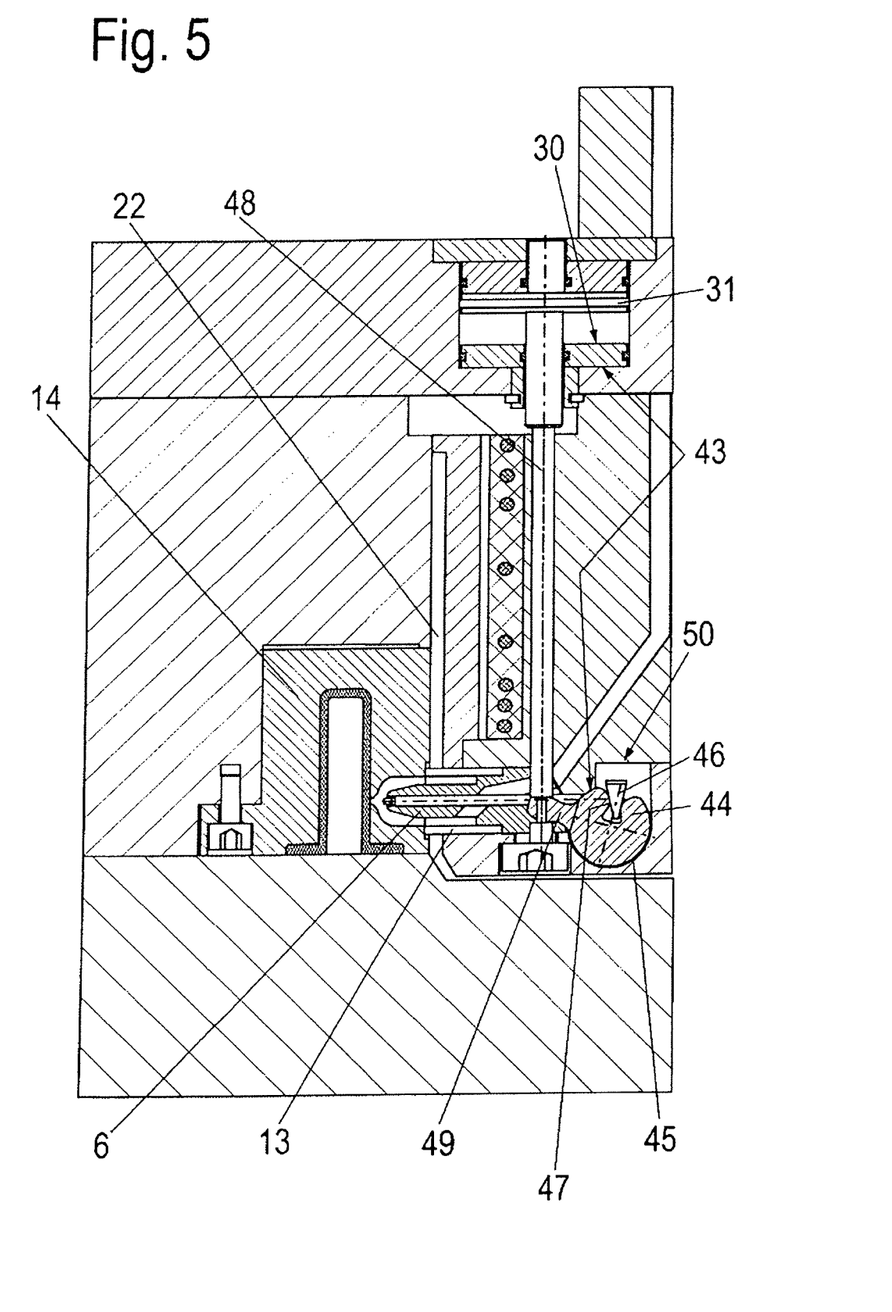
FIG. 5 shows the arrangement of FIG. 4 in a second operating position and having additional drive elements.

The drive 43 is shown in FIGS. 4 and 5.

This drive 43 is suitable for an arrangement of the kind shown in FIG. 9. The nozzle body has a rectangular cross-section and the tip insets 5 are arranged in a row on one or two opposite sides.

The drive 43 comprises a drive shaft 44 which is inserted into a recess 45 in the nozzle body clamping disk section 3, which recess 45 extends perpendicularly, that is, to the plane of the drawing sheet, in the nozzle body and may, for example, be partially cylindrical and semi-cylindrical, and which extends perpendicularly to the X direction. And in FIG. 4, extends further perpendicularly to the plane of the drawing sheet.

The recess 45 is arranged on the side of the nozzle body clamping disk section 3 facing towards the nozzle body base section 2, so that the drive shaft 44 can, for example, be fixed with the nozzle body base section 2.

The recess 45 is dimensioned in such a way that the drive shaft 44 can, for example, be pivoted in the recess 45.

The drive shaft 44 comprises off-centre coupling means for coupling the drive shaft 44 with the shut-off needle 41.

As shown or suggested in FIGS. 4 and 5, the coupling means are formed or configured in such a way that a web-like driven tooth 46 is formed at the end of the shut-off needle 41, which tooth 46 is arranged at an angle, which, for example, is perpendicular to the main axis y of the shut-off needle 41.

The driven tooth 46 engages with one end in a corresponding recess 47 in the drive shaft 44 in the manner of a gearing. That is arranged in such a way that the drive shaft 44, despite the engagement of the wedge-shaped driven tooth 46 in the drive shaft 44, can, for example, be rotated or pivoted about a predetermined angle, see, for example, FIGS. 4 and 5. Simultaneously, it moves the shut-off needle 41 via the driven tooth 46, so that it is displaced and thereby opens and closes the feed borehole 23. This can be achieved in such a way that the walls of the recess 47 are arranged in an arc-shaped manner such that they are able to slide or roll off on the wedge surface of the driven tooth 46.

Figure 6:
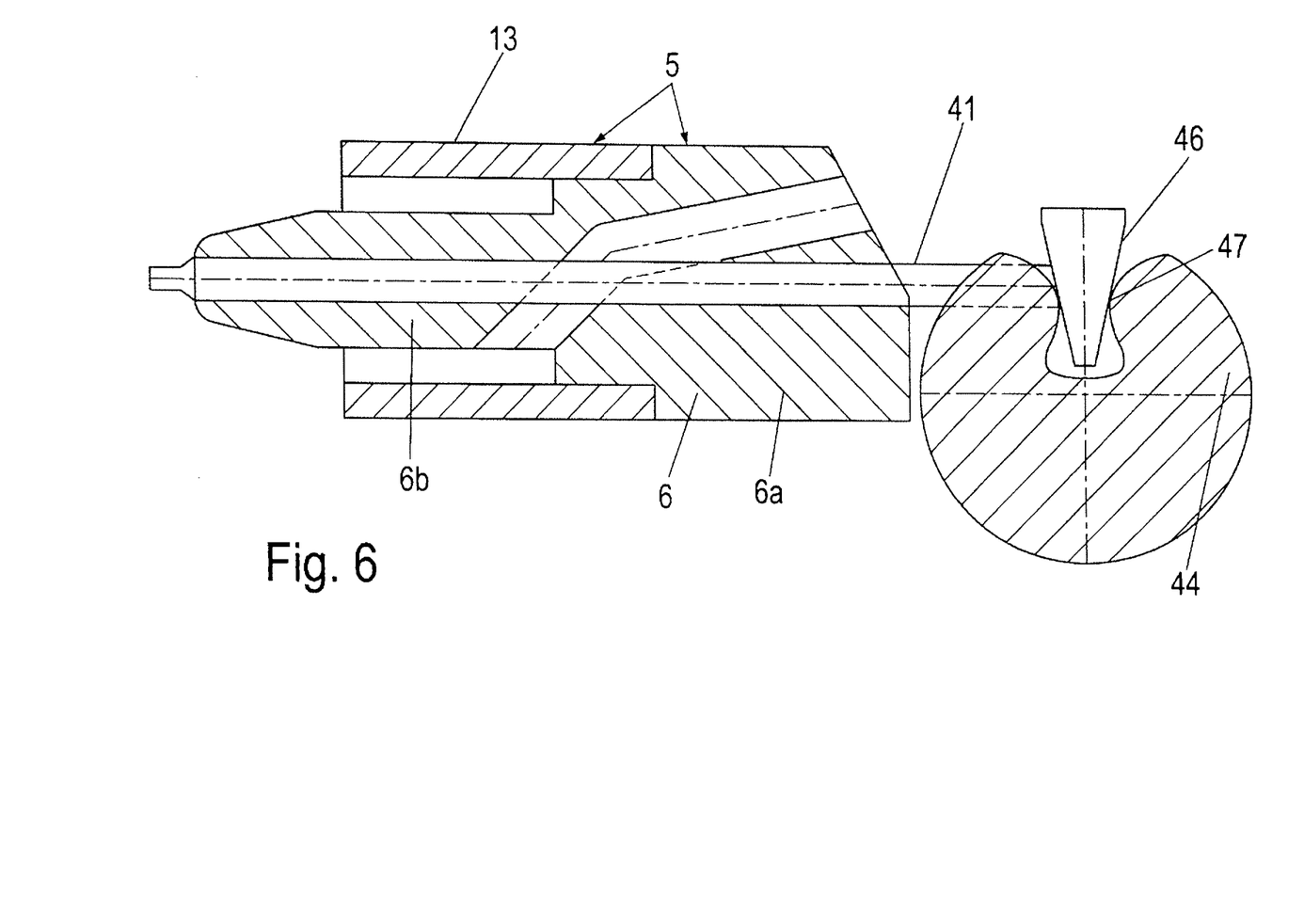
FIG. 6 shows a sectional view through a tip inset of the apparatus, as shown in FIG. 4, comprising a shut-off needle and a drive element.

The drive shaft 44 is coupled with a rod 48 via a shoulder 49 extending over its outside circumference. The rod 48 is coupled directly or by way of a lifting plate with a piston 31 of a fluid-actuated cylinder 30 (see FIGS. 5, 6 and 7).

The nozzle body base section 2 comprises a recess 50 on its side facing towards the nozzle body clamping disk section 3. The drive shaft 44 and the shut-off needle 41 with the driven tooth 46 are configured to move in an unobstructed manner and which is used at least in sections as a bearing for the drive shaft 44.

The recess 47 of the drive shaft 44 in which the driven tooth 46 engages can be arranged in the manner of an involute gear. The coupling mechanism or drive mechanism realized in this manner for the shut-off needle 41 is compact and still especially reliable.

Figure 7:
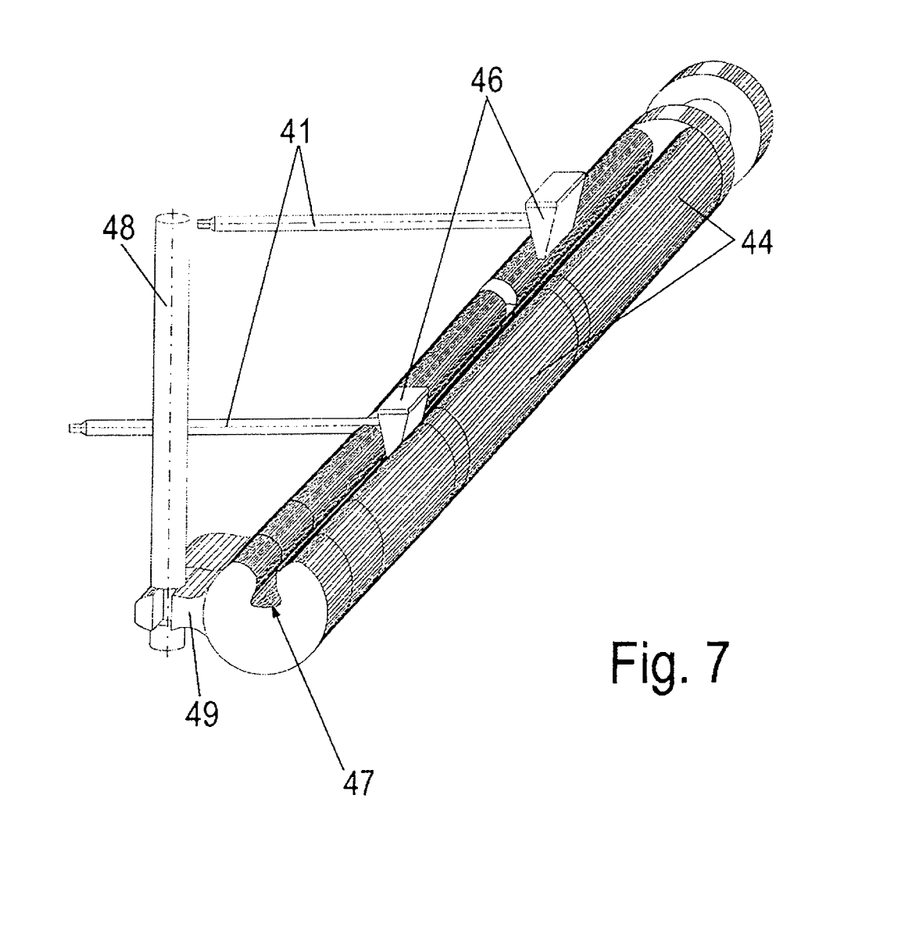
FIG. 7 shows a perspective view of the arrangements of that which is shown in FIG. 5 and FIG. 6.

As is shown in FIG. 7, the recess 47 can extend over the entire axial length of the drive shaft 44, so that it is possible that several driven teeth 46 engage in the drive shaft 44. Several shut-off needles 41 can, for example, be moved in an especially simple way in a linear arrangement of several tip insets 5 in a straight row.

This actuating shaft 44 can, for example, be used as a single or double arrangement in radial versions.

In, for example, the application in nozzles of the linear arrangement, the actuating shaft 44 is configured to move several of the shut-off needles 41 simultaneously, which is shown in FIG. 7.

For this purpose, at least one of the drive shafts 44 may be guided in a recess 50 on the nozzle body base section 2, on the one hand and in the already mentioned recess 45 in the nozzle body clamping disk section 3, on the other hand, in such a way that an axial displacement is prevented and a rotational movement is possible within a sufficient angular range, so that the shut-off needles 41 can be moved to the opened and closed position. See, for example, FIGS. 4, 5, 6 and 7.

The mounting of the tip inset 5, with the shut-off needle 41, occurs as in all other mentioned embodiments in accordance with the present disclosure, by the pivoting movement, whereupon the actuating shaft 44 is inserted in such a way that the recess 47 in the drive shaft 44 accommodates all tooth-like needle heads.

Thereafter, the nozzle body clamping disk section 3 is screwed on, which, in a known manner, presses the tip elements 6 or tip insets 5 with the sealing sleeve 13 in a sealing manner and acts simultaneously as a bearing and guide for the drive shaft 44.

Another mechanism, which includes a gearwheel at the end of the actuating shaft 44 and a toothed rack or of a lever system can, within the scope of the present disclosure, ensure sufficient rotational movement of an angular range of 30°, , for example. In order to ensure that the mechanism can attack, the actuating shaft 44, may, for example, go beyond the face surface of the nozzle body (see FIG. 7).

The pivoting installation or removal of the tip insets 5 allows realizing undercut hot-well geometries.

The construction, as shown in FIGS. 4 to 7 and as described above, is advantageous if the hot nozzle 1 is rectangular and the tip insets 5 are arranged in one row. That is because the actuating shaft 44 can thereby be housed in an advantageous manner.

Needle closure, as is also provided in the embodiments according to FIGS. 1 to 7, demands further that the shut-off needles 18, 41 are able to move into the feed borehole/entrance opening 23 in a highly precise manner.

For this reason, there should not be virtually any displacement in the transversal direction at the level of the gates in the X direction, that is, at the level of the longitudinal axes of the needles/tips. That is because otherwise the shut-off needles 41 and the feed borehole 23 will no longer be in alignment.

In the case of fixing the nozzle body 1 relative to the mold in an upper region, its thermal expansion would lead to the consequence that the nozzle tips or tip elements 6 and, in combination with the nozzle body, the shaft of needles 18, 41 held in the nozzle body would be displaced, and further the drive shafts 44 of the embodiment of FIG. 4. The drive shafts 44 would lead to a change in position of the shut-off needles 41 in the longitudinal direction, because a lever assembly driving the drive shafts 44 would not expand and a shift in the working point of the needle drive mechanism would occur thereby.

This problem is addressed by the embodiments of FIGS. 8 to 10.

The nozzle or nozzle body 1 is installed in such a way that the thermal expansion originates from the axis of the shut-off needle 41. For this purpose, two nozzle body holders 51 are advantageous and are shown in FIGS. 8 to 10. The holders 51 have the shape of a Z in a side view. As a result of these holders 51, the nozzle body 1 is held in the needle plane by a first end of the nozzle body holder 51. The other end of the nozzle body holder 51 is mounted on the cool mold. As a result, the needle or needle tip plane remains idle relative to the mold despite the thermal expansion of the nozzle body 1.

The nozzle body holder 51 comprises a base leg or limb 52 and two holding limbs 53, 54 which are attached to the mutually averted ends of the base limb 52 and extend from the base limb 52 in directions facing away from each other, wherein they may, for example, enclose an angle of 90°, with the base leg 52.

As is shown in FIGS. 8, 9 and 10, the holding limbs 53 engage in corresponding groove-like recesses 55 on opposite outsides of the nozzle bodies, for example, in recesses 55 which are arranged on the sides of the nozzle body 1 where there are no tip elements 5 and which protrude in the circumferential direction beyond the outside circumference of the nozzle body 1. In this case, the nozzle body is the multipart nozzle body 1. The recesses 55 can be arranged in cooperation with the nozzle body base section 2 and nozzle body clamping disk section 3.

The other holding limbs 54 engage in recesses 56 in the mold.

As a result, the holding limbs 53 are used to engage in the hotter nozzle body 1 and the other holding limbs 54 are used to engage in the cool mold enclosing the nozzle body 1.

As is shown in FIG. 10, the region of fixing in the cooler form or in the cooler mold is at a different level in the X direction than the region of the fixing of the nozzle body holders 51 in the warmer or hotter nozzle body 1.

It is advantageous if the holding limbs 53 engage at the same level in the X direction in the nozzle body 1 in which also the tip insets 5 protrude from the nozzle body 1, or at the level X at which the hot plastic material exits to the outside from the nozzle body 1 in the region of the tip elements 6. The holding limb 53 and the recess 55 which accommodates the holding limb 53 can be arranged in a conical manner in order to achieve a positive press fit.

The construction on the face side of the linear nozzle further solves a problem of limited space, since the tips protrude from the longitudinal sides of the nozzle body 1 and it is necessary to provide the contours of the article and the cooling. There is no space there for a special holding construction.

The nozzle body holder 51 rests with the upper projection on a molding plate. The recess for the nozzle 1 in the mold is arranged in such a way that the entire cheek or the base limb 52 rests on the tempered wall of the mold, so that there is no relative expansion between the nozzle holder 51 and the mold. By providing a respective dimensioning, it is within the scope of the present disclosure to achieve the pressing force required for causing the aforementioned press fit facing in the direction of the conical holding limb 53.

The lower limb 53 engages in the recess 55 of the nozzle body 1 precisely at the level of the gates, that is, the needles, by which the nozzle is fixed in the mold at this level. It is able to expand thermally in the direction of the distributor and produce the sealing effect between the distributor and the nozzle. In the direct contact region of the nozzle, the nozzle holder 51 will assume a higher temperature than the mold temperature. This occurs however only in a locally limited way and only at the level between the nozzle 1 and the mold temperature, so that the resulting thermal shift remains negligibly small.

The embodiments of FIGS. 1 to 3 and 4 to 7 show arrangements in which the spraying directions and thus the axial directions of the nozzle tips extend either in the X or Y direction, with the axial directions of the shut-off needles 18, 41 respectively, corresponding to these directions. It is, therefore, within the scope of the present disclosure for shut-off needles 18, 41, which are movable in the X and Y direction, to vary the spraying direction and therefore the direction of the nozzle tip axes by an angle of up to +/−20°, . Thus, it may be necessary, within the scope of the present disclosure, to bevel the ends of the shut-off needles 18, 41 in order to match the surface of the article.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A hot nozzle for spraying of plastic components, the hot nozzle comprising:
a multipart nozzle body including a tip inset including a tip element having a tip section protruding outwardly beyond a circumferential surface of the multipart nozzle body into a molding plate;
wherein the tip section of the tip element is penetrated by a shut-off needle which is movable in a reciprocating manner by a drive, the shut-off needle being movable between a position in which the shut-off needle closes off a feed borehole in the molding plate and a position in which the shut-off needle opens the feed borehole;
wherein the shut-off needle and the tip element are aligned in the same direction and the feed borehole is aligned in a direction of a main axis of the tip element;
wherein the shut-off needle axially completely penetrates the tip element and the shut-off needle includes a drive tooth on a side facing away from the feed borehole, which drive tooth engages in a recess in a drive shaft held rotatably in the multipart nozzle body; and
wherein the recess in the drive shaft has the shape of an involute gear recess.

2. The hot nozzle according to claim 1, wherein the shut-off needle and the tip inset are arranged at an angle in relation to each other, and the feed borehole is aligned at an angle in the molding plate in relation to a direction of an extension of the tip element.

3. The hot nozzle according to claim 1, wherein the tip section is configured to include a tip with two fork webs, between which webs a gap is formed which penetrates the shut-off needle without touching the tip section of the tip inset, and the fork webs are arranged in such a way that they guide a heat flow, and thereby a melt flow, from a first direction to a second direction into a region of the feed borehole.

4. The hot nozzle according to claim 1, wherein the drive is a fluid-actuated or pneumatic cylinder which acts directly or by way of a lifting plate on the shut-off needle.

5. The hot nozzle according to claim 1, wherein the shut-off needle does not touch the multipart nozzle body in any operating position of the hot nozzle.

6. The hot nozzle according to claim 1, wherein the drive shaft includes a shoulder which is coupled via a rod or directly with a fluid-actuated or pneumatic cylinder.

7. The hot nozzle according to claim 1, wherein the multipart nozzle body has a polygonal cross section and the tip inset is arranged on a side of the multipart nozzle body and the shut-off needle is moved with only one single drive shaft.

8. The hot nozzle according to claim 1, wherein the tip inset is fixed by a nozzle body clamping disk section to a nozzle body base section.

9. The hot nozzle according to claim 1, wherein the tip inset includes a sealing sleeve and rests by way of an oblique surface on a corresponding oblique surface in the nozzle body base section.

10. The hot nozzle according to claim 1, wherein the multipart nozzle body is held by nozzle body holders in the mold, which holders are arranged in such a way that the location of the holding of the nozzle body in the X direction is disposed at a different level than the location of holding in the mold.

11. The hot nozzle according to claim 10, wherein the nozzle body holders are arranged in such a way that the location of the holding of the nozzle body lies in the X direction at a level of a region in which the tip inset is arranged in the multipart nozzle body.

12. The hot nozzle according to claim 10, wherein the holders are arranged in the shape of a Z and include two holding limbs which face away from each other, with one of the holding limbs engaging in a cooler mold and the other of the holding limbs engaging in the multipart nozzle body which is hotter.

13. The hot nozzle according to claim 2, wherein the angle arranged between the shut-off needle and the tip inset is a right angle and the angle that the feed borehole is aligned in the molding plate in relation to the main extension of the tip element is a right angle.

14. The hot nozzle according to claim 1, wherein the multipart nozzle body has a polygonal cross section and the hot nozzle further comprises a plurality of shut-off needles and tip insets arranged in a straight row on one or more sides of the multipart nozzle body and one or more of the plurality of shut-off needles are moved with only one single drive shaft.

15. A hot nozzle for spraying of plastic components, the hot nozzle comprising:
a multipart nozzle body including a tip inset including a tip element having a tip section protruding outwardly beyond a circumferential surface of the multipart nozzle body into a molding plate;
wherein the tip section of the tip element is penetrated by a shut-off needle which is movable in a reciprocating manner by a drive, the shut-off needle being movable between a position in which the shut-off needle closes off a feed borehole in the molding plate and a position in which the shut-off needle opens the feed borehole; and
wherein the tip inset includes a sealing sleeve and rests by way of an oblique surface on a corresponding oblique surface in the nozzle body base section.

16. A hot nozzle for spraying of plastic components, the hot nozzle comprising:
a multipart nozzle body including a tip inset including a tip element having a tip section protruding outwardly beyond a circumferential surface of the multipart nozzle body into a molding plate;
wherein the tip section of the tip element is penetrated by a shut-off needle which is movable in a reciprocating manner by a drive, the shut-off needle being movable between a position in which the shut-off needle closes off a feed borehole in the molding plate and a position in which the shut-off needle opens the feed borehole;
wherein the multipart nozzle body is held by nozzle body holders in the mold, which holders are arranged in such a way that the location of the holding of the nozzle body in the X direction is disposed at a different level than the location of holding in the mold; and
wherein the holders are arranged in the shape of a Z and include two holding limbs which face away from each other, with one of the holding limbs engaging in a cooler mold and the other of the holding limbs engaging in the multipart nozzle body which is hotter.

* * * * *